US010325276B2

(12) United States Patent
Walz et al.

(10) Patent No.: US 10,325,276 B2
(45) Date of Patent: Jun. 18, 2019

(54) FINANCIAL REPORTING SYSTEM INTEGRATING MARKET SEGMENT ATTRIBUTES AND ACCOUNTING DATA

(71) Applicant: SAP SE, Walldorf (DE)

(72) Inventors: Stefan Walz, Sinzheim (DE); Joachim Welte, Ubstadt-Weiher (DE); Frank Zeisberger, Heidelberg (DE); Joachim Kenntner, Heidelberg (DE); Christiane Cramer, Weingarten (DE); Peter Himmighoefer, Roemerberg (DE); Georg Dopf, Schwetzingen (DE)

(73) Assignee: SAP SE, Walldorf (DE)

( * ) Notice: Subject to any disclaimer, the term of this patent is extended or adjusted under 35 U.S.C. 154(b) by 807 days.

(21) Appl. No.: 14/711,372

(22) Filed: May 13, 2015

(65) Prior Publication Data
US 2016/0292704 A1    Oct. 6, 2016

Related U.S. Application Data

(60) Provisional application No. 62/139,909, filed on Mar. 30, 2015.

(51) Int. Cl.
*G06Q 30/02*   (2012.01)
*G06Q 40/00*   (2012.01)

(52) U.S. Cl.
CPC ......... *G06Q 30/0204* (2013.01); *G06Q 40/12* (2013.12)

(58) Field of Classification Search
None
See application file for complete search history.

(56) References Cited

U.S. PATENT DOCUMENTS

| | | | | |
|---|---|---|---|---|
| 6,058,378 | A | * | 5/2000 | Clark ............... G06Q 20/10 705/37 |
| 6,513,019 | B2 | * | 1/2003 | Lewis ............... G06Q 30/04 705/35 |
| 6,993,533 | B1 | | 1/2006 | Barnes |
| 7,987,121 | B2 | | 7/2011 | Conrad et al. |
| 8,055,559 | B2 | | 11/2011 | Gelerman |
| 8,224,791 | B2 | | 7/2012 | Rieger |

(Continued)

*Primary Examiner* — Thomas L Mansfield
(74) *Attorney, Agent, or Firm* — Fountainhead Law Group P.C.

(57) ABSTRACT

Financial reporting methods and systems integrate profitability and accounting data. A universal journal entry allows user definition of relevant characteristics for a market segment. The entry appends the structure of a financial document to provide linkage to market segment characteristics. When creating the financial document including profit and loss (P&L) and balance account line items, a market segment is defined with determined characteristics stored in the line item on the basis of business process dependent rules. For example in posting information on a sales order item, sales order data may be read, and customer, product, and/or other sales order information input. Additional data can be derived on the basis of the determined master data, depending upon user needs. Embodiments allow enriched reporting (e.g., flexible market segment reporting) at the line item level, affording intuitive access to defined characteristics, e.g., drill-down into details of P&L and balance account information.

17 Claims, 13 Drawing Sheets

(56) References Cited

U.S. PATENT DOCUMENTS

| | | |
|---|---|---|
| 8,311,908 B2 | 11/2012 | Maguire, III et al. |
| 8,401,907 B2 | 3/2013 | Litzow et al. |
| 8,428,997 B2 | 4/2013 | Maga et al. |
| 8,510,182 B2 | 8/2013 | Pannicke et al. |
| 8,738,864 B2 | 5/2014 | Katzung et al. |
| 2003/0069648 A1* | 4/2003 | Douglas ............ G06Q 10/20 700/2 |
| 2005/0049903 A1* | 3/2005 | Raja ............ G06Q 10/10 705/32 |
| 2007/0156552 A1* | 7/2007 | Manganiello ......... G06Q 40/00 705/35 |
| 2007/0288357 A1* | 12/2007 | Holman ............ G06Q 40/02 705/38 |
| 2007/0295809 A1* | 12/2007 | Beck ............ G06Q 20/203 235/385 |
| 2008/0120129 A1 | 5/2008 | Seubert et al. |
| 2009/0024536 A1 | 1/2009 | Archer et al. |
| 2009/0043625 A1 | 2/2009 | Yao |
| 2009/0327106 A1* | 12/2009 | Bartelt ............ G06Q 40/08 705/30 |
| 2010/0250409 A1 | 9/2010 | Savage et al. |
| 2011/0125567 A1 | 5/2011 | DeLillio |
| 2014/0188675 A1 | 7/2014 | Brown et al. |

\* cited by examiner

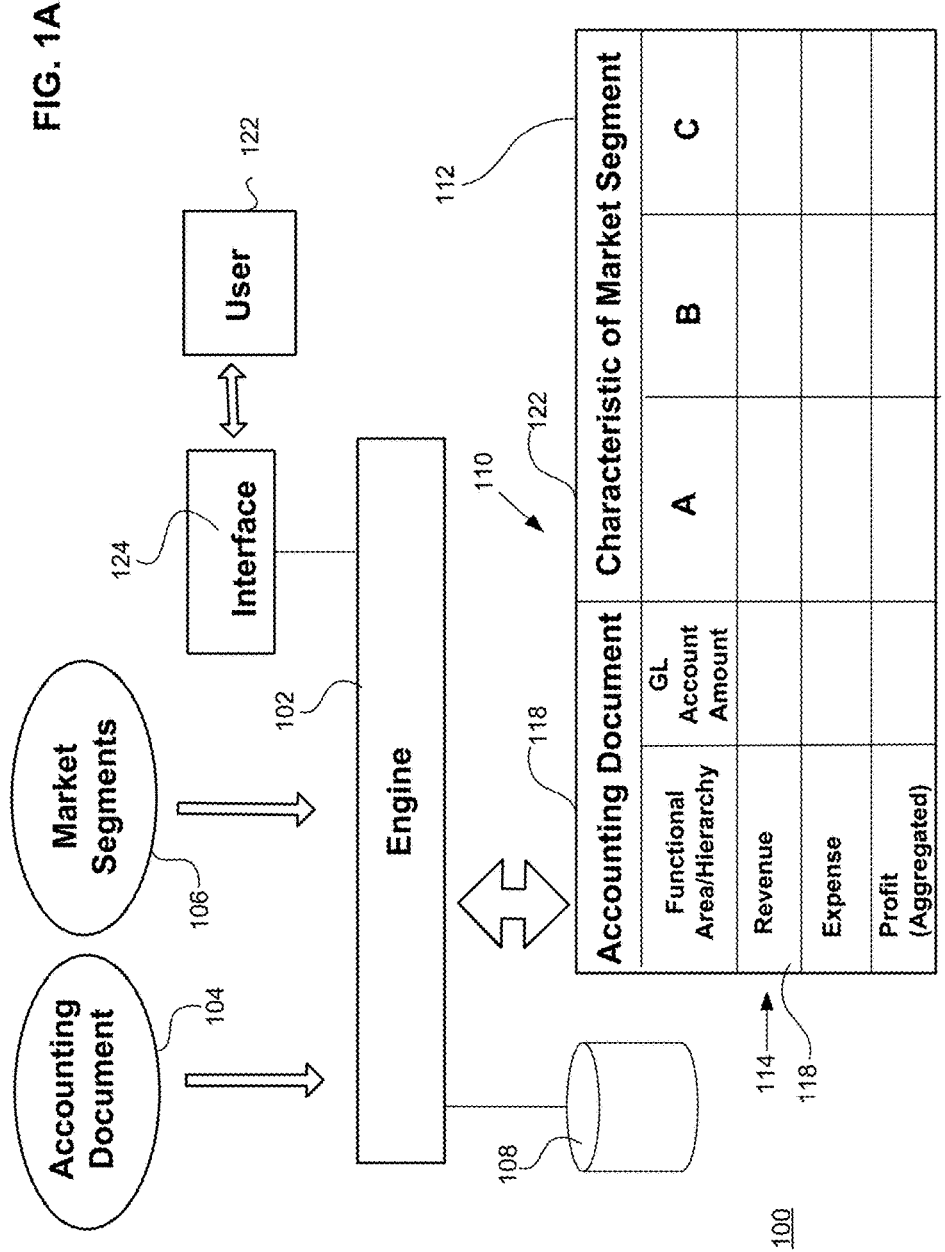

Legal COS Reporting on Functional Area 132      Profitability (Management) Reporting by Market Segment 134

Amount Company Currency

| Functional Area | 140 Travel | | 170 Consumer Products | | 191 Boiler, Heater, Assemblies | |
|---|---|---|---|---|---|---|
| Profitability Line | Amount Company Currency | | Amount Company Currency | | Amount Company Currency | |
| × Gross Revenues | 2,516,490.00 EUR | | 81,680.00 EUR | | 812,010.00 EUR | | 4,133,232.00 EUR |
| ▲ Sales Discounts and Allowances | -22,700.00 EUR | | -480.00 EUR | | -20,427.30 EUR | | -68,003.80 EUR |
| ◆ Net Sales Revenue | 2,493,790.00 EUR | | 81,120.00 EUR | | 791,582.70 EUR | | 4,065,228.17 EUR |
| ● Cost of Goods Sold | -502,260.00 EUR | | -39,800.00 EUR | | -262,778.67 EUR | | -1,204,942.05 EUR |
| ◆ Gross Profit on Sales | 1,991,530.00 EUR | | 21,320.00 EUR | | 528,804.03 EUR | | 2,860,286.12 EUR |
| ● Selling Expenses | | | | | | |
| ● Administrative or General Expenses | | | | | | |
| ● Other Operating Gains | | | | | | 393,564.16 EUR |
| ● Other Operating Expenses | | | | | | |
| ◆ Income from Operations | 1,991,530.00 EUR | | 21,320.00 EUR | | 528,804.03 EUR | | 3,253,850.28 EUR |

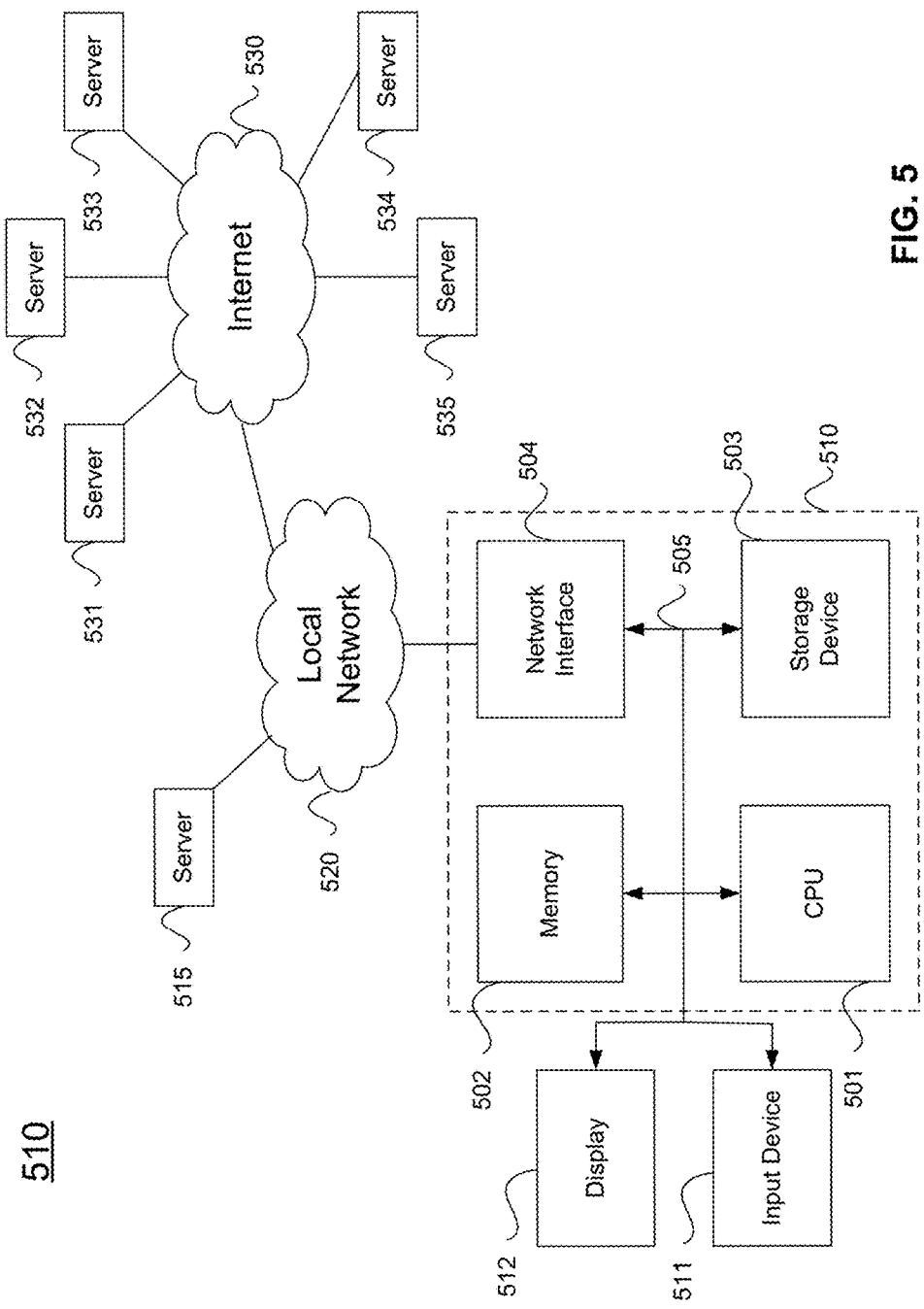

FINANCIAL REPORTING SYSTEM INTEGRATING MARKET SEGMENT ATTRIBUTES AND ACCOUNTING DATA

CROSS-REFERENCE TO RELATED APPLICATION

The instant nonprovisional patent application claims priority to U.S. Provisional Patent Application No. 62/139,909, filed Mar. 30, 2015 and incorporated by reference in its entirety herein for all purposes.

BACKGROUND

Unless otherwise indicated herein, the approaches described in this section are not prior art to the claims in this application and are not admitted to be prior art by inclusion in this section.

Embodiments relate to financial reporting, and in particular to such reporting systems and methods integrating market segment data (e.g., profitability data).

Business enterprises increasingly rely upon complex business software for a variety of purposes, including financial reporting. Commonly, profitability information is stored in a database comprising entities (such as structured data objects) that are different from those of a separate database that tracks accounting information of the enterprise.

Different databases have historically been used for profitability and general accounting information for a variety of reasons. One is that the profitability data may provide additional market segment information, while the general accounting information is relied upon for different purposes (such as legal purposes).

Such storage of profitability and accounting data in separate databases, may give rise to a number of challenges. One is reconciliation of data persistence between the two databases. This can require a substantial effort with ongoing system configuration activities.

Lack of transparency is another issue that may arise from separate storage of profitability and accounting information. In particular, an inability to easily link profitability data with financial documents can hinder the recognition of important case-and-effect relationships by a user.

Reporting is still another aspect that may be affected by separate storage of profitability and accounting information. For example, profitability data may be posted in the profitability database as a batch job during the end-of-period activities (e.g., settlement). As a result, only backwards reporting (i.e., profitability-to-financials) may be possible. The latest available profitability reporting may thus not be current, instead reflecting only data of a previous time period.

In addition, the market segments/characteristics provided for the profitability database, may only available for revenues and costs to provide multi-level contribution margin reporting. Balance accounts are not included.

SUMMARY

Financial reporting methods and systems according to embodiments, integrate profitability and accounting data. A universal journal entry allows user definition of relevant characteristics for a market segment. The entry appends the structure of a financial document to provide linkage to market segment characteristics. When creating the financial document including profit and loss (P&L) and balance account line items, a market segment is defined with determined characteristics stored in the line item on the basis of business process dependent rules. For example in posting information on a sales order item, sales order data may be read, and customer, product, and/or other sales order information input. Additional data can be derived on the basis of the determined master data, depending upon user needs. Embodiments allow enriched reporting (e.g., flexible market segment reporting) at the line item level, affording a user with intuitive access to defined characteristics (e.g., drill-down into details of P&L and balance account information).

An embodiment of a computer-implemented method comprises an engine receiving accounting data, and the engine receiving market segment information defined with a plurality of characteristics. The engine integrates the plurality of characteristics with the accounting data according to a ruleset to generate a universal journal entry as a database table comprising a line item broken down into the plurality of characteristics. The engine displays a report including the line item and the at least one of the plurality of characteristics.

A non-transitory computer readable storage medium embodies a computer program for performing a method comprising an engine receiving accounting data and market segment information defined with a plurality of characteristics. The engine integrates the plurality of characteristics with the accounting data according to a ruleset to generate a universal journal entry as a database table comprising a line item broken down into the plurality of characteristics based upon business process dependent rules of the ruleset. The engine displays a report including the line item and at least one of the plurality of characteristics.

An embodiment of a computer system comprises one or more processors and a software program executable on said computer system. The software program is configured to cause an engine to receive accounting data and receive market segment information including a plurality of characteristics. The software program is configured to cause the engine to integrate the profitability data with the accounting data according to a ruleset to generate a universal journal entry as a database table comprising a line item broken down into the plurality of characteristics based upon business process dependent rules of the ruleset, wherein the line item comprises income or expense. The software program is configured to cause the engine to display a report including the line item and at least one one of the characteristics.

In some embodiments the plurality of characteristics are stored in the line item according to business process dependent rules of the ruleset.

In particular embodiments the line item comprises aggregated profit.

In various embodiments wherein the line item comprises income.

In certain embodiments the line item comprises expenses.

According to some embodiments the accounting data comprises an existing database table, and the database table includes an extension to the existing database table.

In particular embodiments the report comprises a plot having an axis reflecting the at least one of the plurality of characteristics.

In various embodiments the at least one of the plurality of characteristics comprises a product line, geographic region, or customer.

In some embodiments the at least one of the plurality of characteristics comprises a cost accounting object type.

The following detailed description and accompanying drawings provide a better understanding of the nature and advantages of embodiments.

BRIEF DESCRIPTION OF THE DRAWINGS

FIG. 1A is a simplified view of a system configured to provide financial reporting according to an embodiment.

FIG. 1B is a simplified view of an example of a financial report generated according to an embodiment.

FIGS. 3A-D show details of particular examples of universal journal entry table structure.

FIG. 5 illustrates an example of a computer system.

DETAILED DESCRIPTION

Figure 1D:
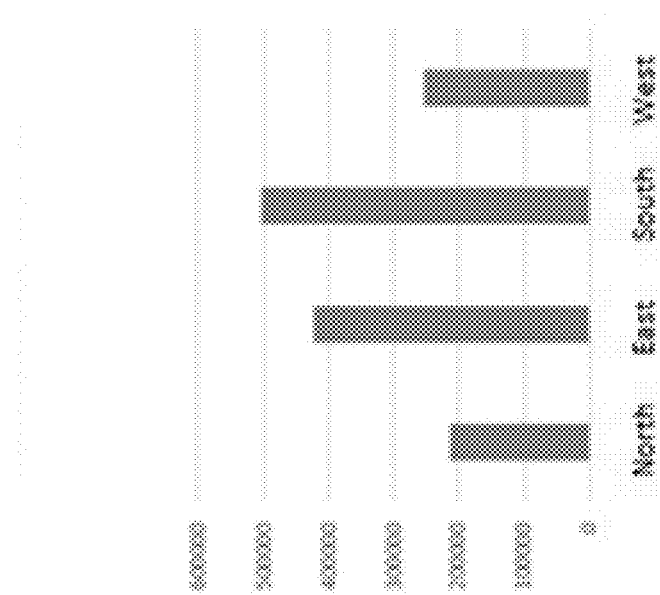
FIGS. 1C-D show examples of data visualizations afforded by financial reporting according to embodiments.

Described herein are systems and methods providing financial reporting that integrates profitability data and accounting data. In the following description, for purposes of explanation, numerous examples and specific details are set forth in order to provide a thorough understanding of the present invention. It will be evident, however, to one skilled in the art that embodiments of the present invention as defined by the claims may include some or all of the features in these examples alone or in combination with other features described below, and may further include modifications and equivalents of the features and concepts described herein.

Embodiments provide financial reporting methods and systems that integrate profitability and accounting data. A new universal journal entry allows a user to define relevant characteristics of a market segment. The new universal journal entry allows appending those fields to the financial document structure, thereby providing by a new engine linkage between the market segment characteristics and the financial document. Specifically, for profit and loss (P&L) and defined balance account line items, at the time of posting and document creation a market segment is defined, and the determined characteristics are stored in the financial document line item. This additional characteristics information may be defined on the basis of business process dependent rules maintained by the user.

For example in posting information on a sales order item, data of the sales order may be read, and customer, product, and/or other sales order information input. Additional data can then be derived on the basis of the determined master data, depending upon user needs. Thus in posting on a customer project, the leading sales order item can be determined and additional data derived as appropriate.

Components of the universal journal entry according to embodiments may allow enriched reporting. Examples can include but are not limited to, posting costs—as new Management Accounting type of Accounting document line items—utilized in calculations, e.g., freights, provision, customer deductions by interpreting pricing conditions, and/or further customer specific customizing.

Embodiments thus provide flexible market segment reporting on the level of a line item. This provides intuitive access to defined characteristics, allowing the user to drill down for details regarding characteristics of P&L and balance account information.

FIG. 1A shows a simplified view of a system 100 according to an embodiment, configured to provide financial reporting integrating profitability and accounting data. Specifically, engine 102 is configured to receive general accounting data 104 and process dependent market segment attributes data 106.

The engine is in communication with a ruleset 108. Based upon rules in the ruleset, the engine processes the incoming general accounting data 104 and market segment data 106 in order to create in an underlying database 110, a complex data structure 112 (e.g., data object) comprising universal journal entries 114 that integrate both general accounting and profitability information.

In particular the line items 116 of the universal journal entries include the functional area 118. Data in this functional area reflects information typically available from general accounting sources, for example income and expenses. Such general accounting information may reflect some profit measure, but this is typically crude (e.g., gross profit on sales) and not well-suited for detailed reporting purposes. Providing a hierarchy on functional area during design time, allows an aggregated reporting with gross margin sums.

Here, however, the line items further include more specialized information typical of profitability data. For example, line items of the universal journal entries may include characteristics 120 reflecting specific market information (e.g., breaking down financial data according to different market segments A, B, C).

These characteristics may be referenced by the engine in providing enriched financial reporting to a user 122 via user interface 124. For example, they permit ready user access not merely to gross income, expense, and profit information, but also drill-down into details according to market segment.

FIG. 1B thus shows an example of a financial report provided to a user by the engine according to an embodiment. Here, report 130 comprises a functional area 132 including cost on sales (COS) information of the type generally available from general accounting data sources. For drilling down into further details, the General Ledger (GL) Account is available showing a nature of the expense.

Financial report 130, however, further comprises profitability data 134. This profitability data includes specific characteristics according to market segment, e.g., for the expense Account Travel the profitability characteristic product group with value "Consumer Products", and other product segments.

Reports generated according to embodiments may thus accommodate the analysis of financial information with a flexibility and detail not typically available to conventional approaches. For example, the report of FIG. 1B includes a specific characteristic/segment describing travel costs.

Figure 1C:
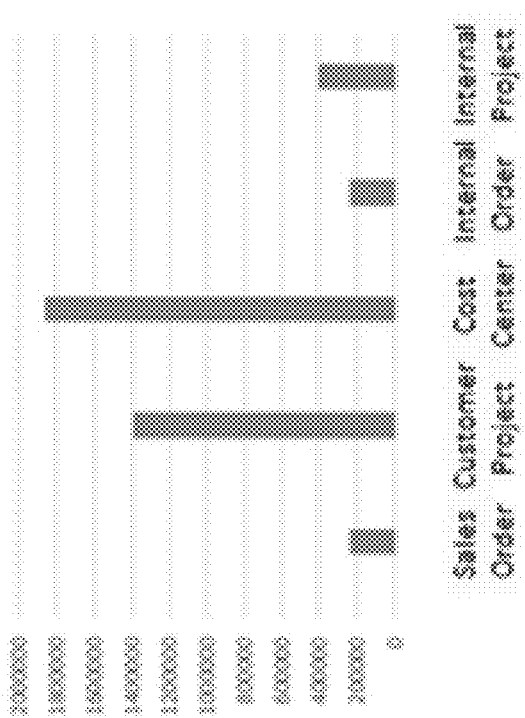

Accordingly, this report allows costs to be allocated to a market segment, with travel costs posted to CO-Objects from which the market segment is derived. Thus FIG. 1C is a bar chart visualizing air travel by cost accounting object type (e.g., Sales Order, Customer Project, etc.). FIG. 1D is a bar chart visualizing air travel by Sales Region (e.g., West, South, etc.)

Figure 1E:
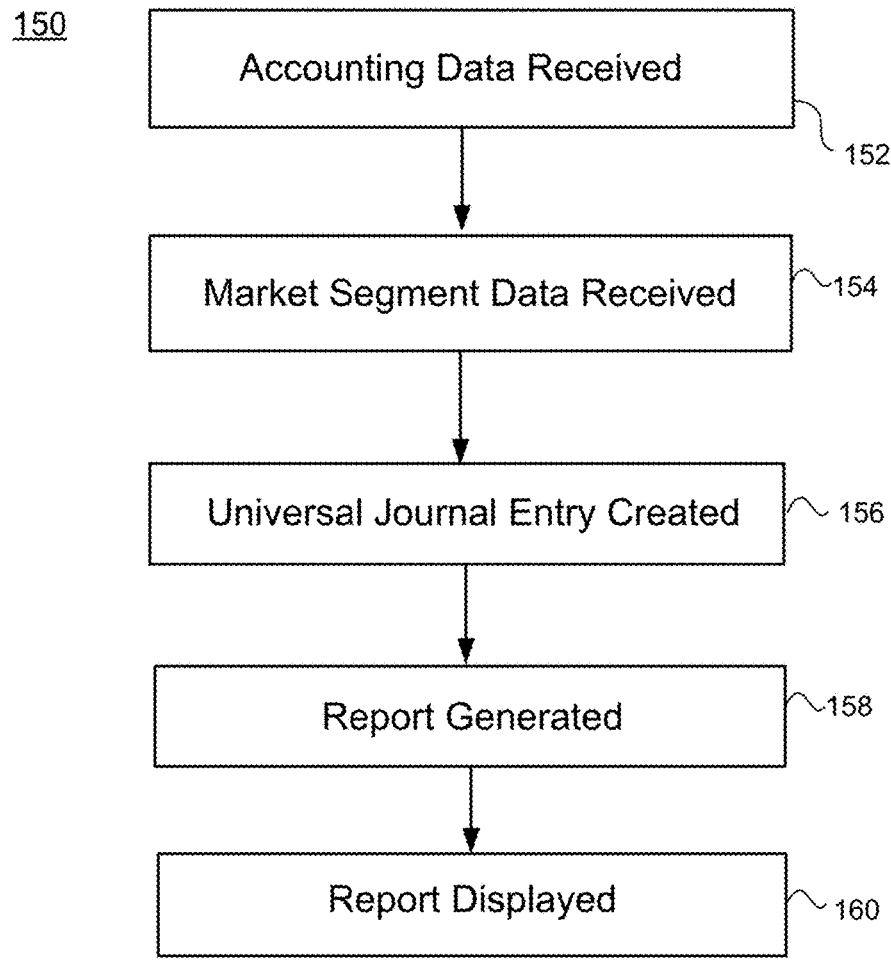
FIG. 1E is a simplified flow diagram of a process flow according to an embodiment.

FIG. 1E is a simplified flow diagram showing a method 150 according to an embodiment. In a first step 152 an engine receives accounting data.

In a second step 154 the engine receives market segment information. In a third step 156 the engine processes the accounting data and the market segment information data to create a universal journal entry integrating the accounting data and the market segment information to allow profitability reporting out of P&L reporting.

In a fourth step 158 the engine generates a report from the universal journal entry. In a fifth step 160, the engine displays the report to a user.

Further details regarding systems and methods of financial reporting integrating profitability and accounting data, are provided below in connection with the following specific example.

EXAMPLE

Figure 2A:
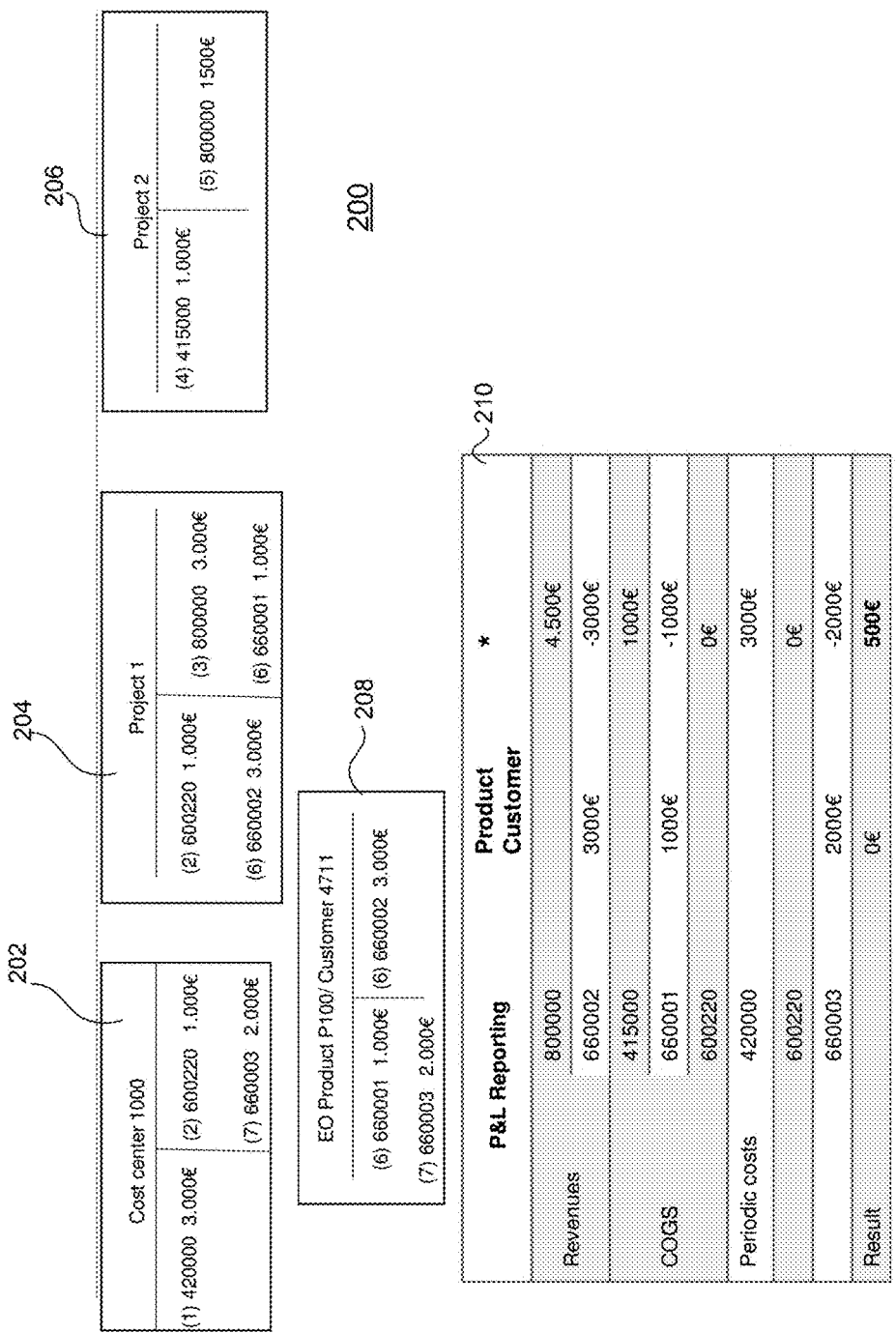
FIG. 2A shows a simplified view of processing for financial reporting of project based services according to an example.

An example of a financial reporting methods and systems according to an embodiment, is now presented in connection with financial reporting of project based services. In particular, FIG. 2A shows a simplified view of financial data 200 comprising seven (7) different transactions involving a cost center 202 whose resources are utilized in connection with two different projects 204, 206. The data of the cost center reflects periodic costs, while the data of the two projects reflects Cost of Goods Sold (COGS).

A key to the seven transactions is given in the following table.

| | |
|---|---|
| (1) | Salary |
| (2) | Time confirmation 10 h 100€/h |
| (3) | Billing on project 1 |
| (4) | Supplier invoice on project 2 |
| (5) | Revenues on project 2 |
| (6) | Settlement project 1 to PA (Profitability segment) |
| (7) | Allocation cc to PA (Profitability segment) |

Financial information 208 corresponds to a particular Product P100 and Customer 4711. Transaction (6) represents COGS, while transaction (7) represents periodic costs.

Figure 2B:
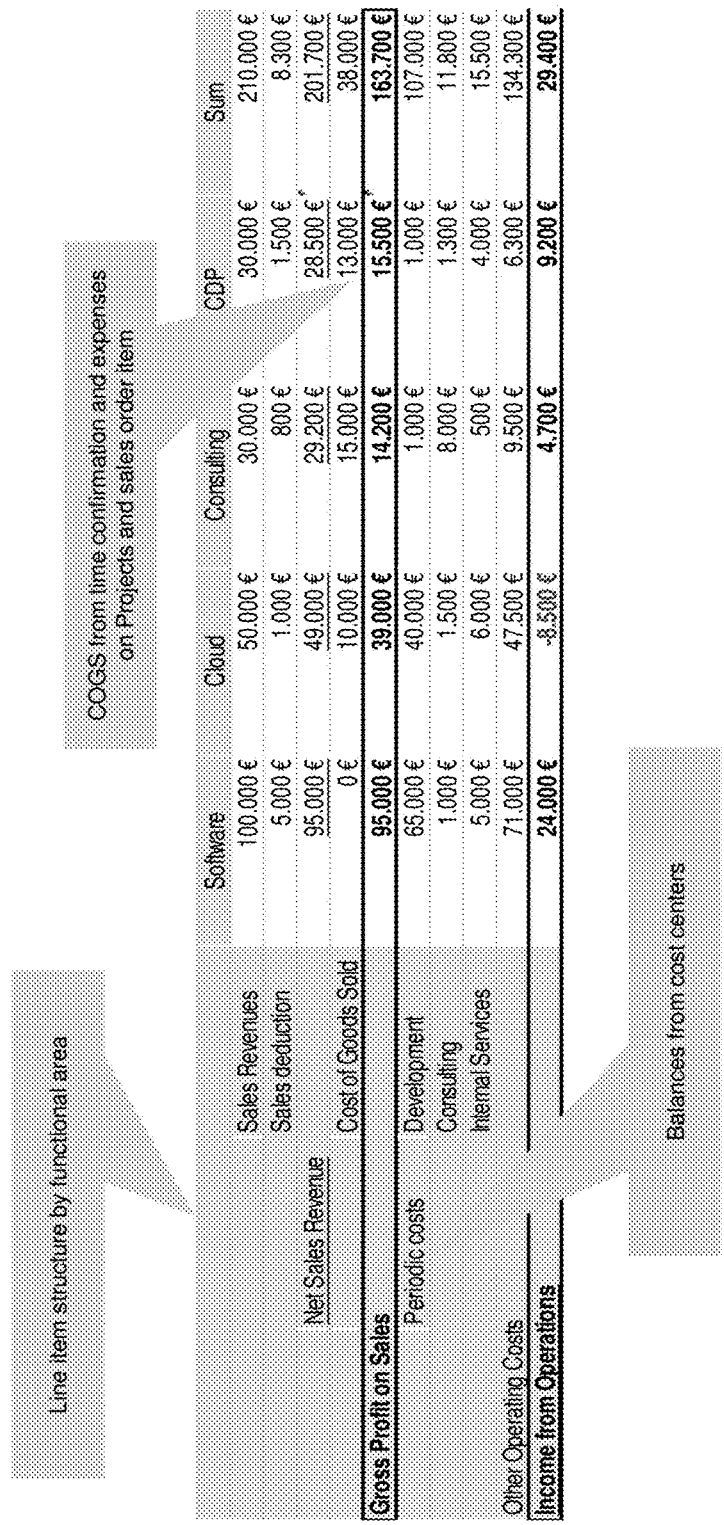
FIG. 2B shows a report of financial information which may be generated according to an example.

Processing of financial information for reporting according to embodiments, thus allows for new reporting qualities by profitability. This is illustrated in the display interface of FIG. 2B, which allows P&L drilldown by Product group (e.g., Software, Cloud, Consulting, etc.). In the manner shown, market segments from different CO-Objects may be brought together, allowing a user to report: periodic costs—on cost center—meets revenues—on sales orders.

Embodiments allow reporting of financial information in an insightful manner to a user. One example of such a visualization of financial data is profitability on a time line (e.g., X-axis) with market segment as filter value or for comparison. Another example of such a visualization of financial data is profitability on a time line (e.g., X-axis) taken over a specific period to analyze line particular line items.

The structure of a Universal Journal Entry (UJE) according to some exemplary embodiments, is now described. In particular, a UJE line item (table=ACDOCA) combines FIN applications and may include one or more of the following:
 some FAGLFLEXA fields (flexible subledgers);
 some BSEG fields (old FIN table);
 some COEP fields (Cost management table);
 some ANEP fields (Asset Accounting);
 some MLIT/MLCR fields (Material ledger);
 fixed CEST4 fields of CE4SFIN (Market segment fields);
 an extension may include for CI_COBL and CE4-fields (Market segment fields).

Figure 3A:
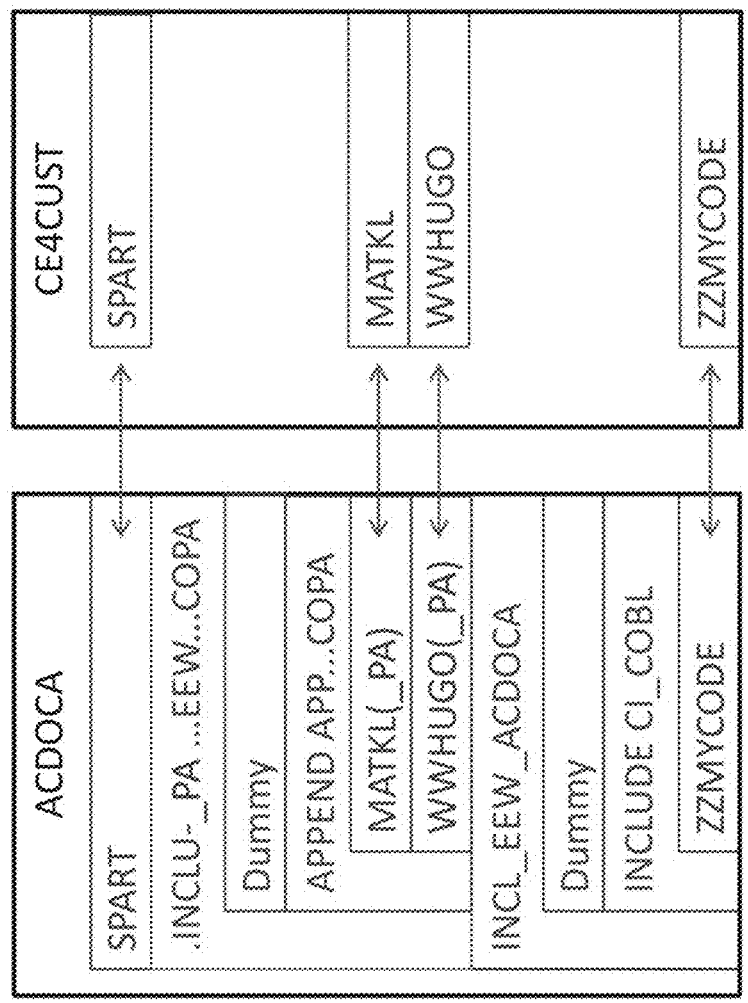

FIG. 3A shows a simplified view of a UJE according to an embodiment. Such a UJE may be structured to afford extensibility to interact with other components, such as particular user interfaces.

For example, this embodiment offers unified JE extensibility including CO-PA. In the ACDOCA table, the APPEND APP . . . COPA may include a package KEG0 (like CE4xxxx). Identical field names may be used, with a suffix in the table avoiding collisions.

Also, FIORI is a particular user interface that is offered by SAP SE of Walldorf, Germany. The particular embodiment of FIG. 3A provides for separation from CI_COBL fields for FIORI extensibility.

The CE4CUST table is a CO-PA table including characteristics encoded by object numbers (PAOBJNR). This may be generated in package KEG0.

Figure 3B:
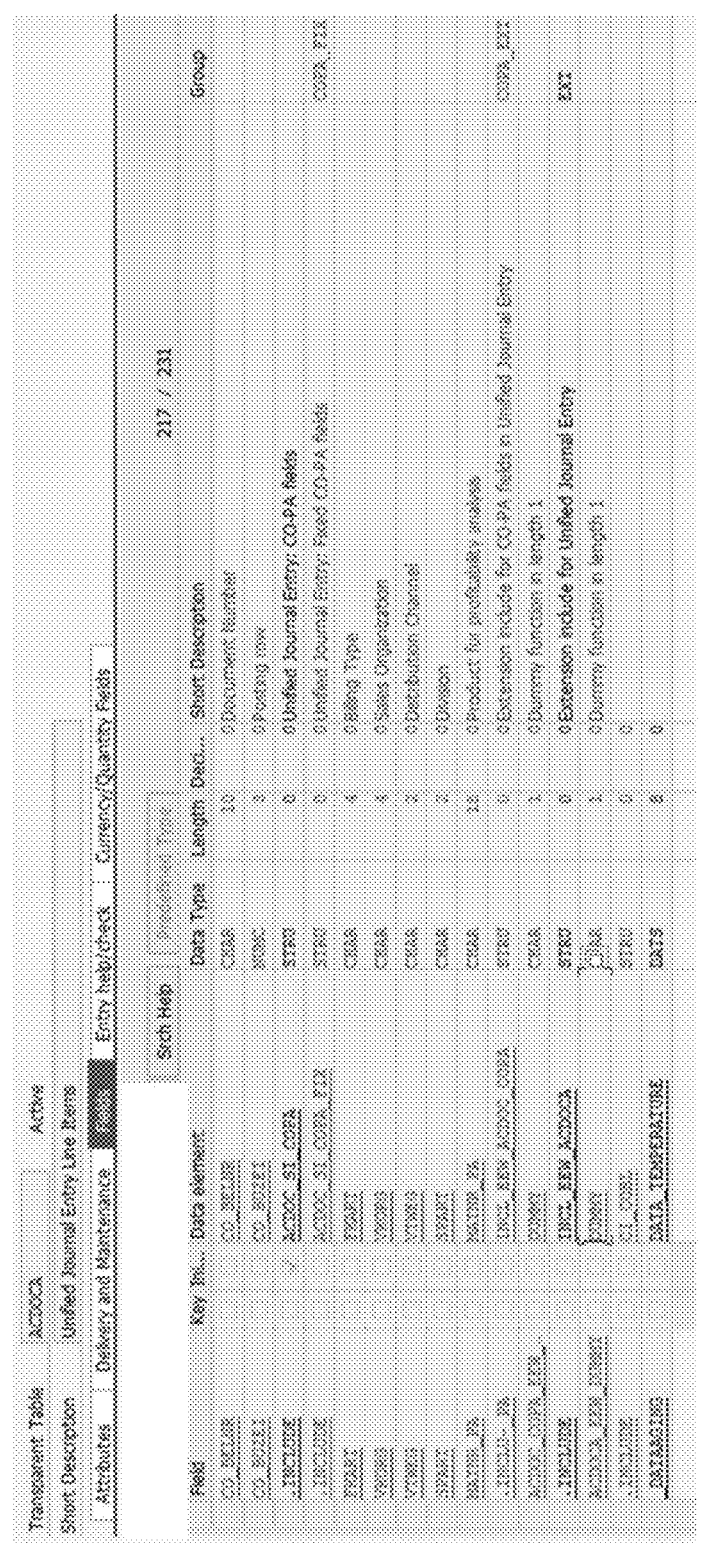

FIG. 3B shows one possible implementation of a UJE. Here, the table ACDOCA contains, in ACDOC_SI_COPA, extension include INCL_EEW_ACDOC_COPA with suffix _PA. CO-PA configuration generates an APPEND to this include in Package KEG0 to hold additional CO-PA characteristics. Field names are identical to the CE4-table. The suffix _PA ensures no conflicts with existing ACDOCA field names.

Coding block customer fields and other extensions go into separate INCL_EEW_ACDOCA.

Figure 3C:
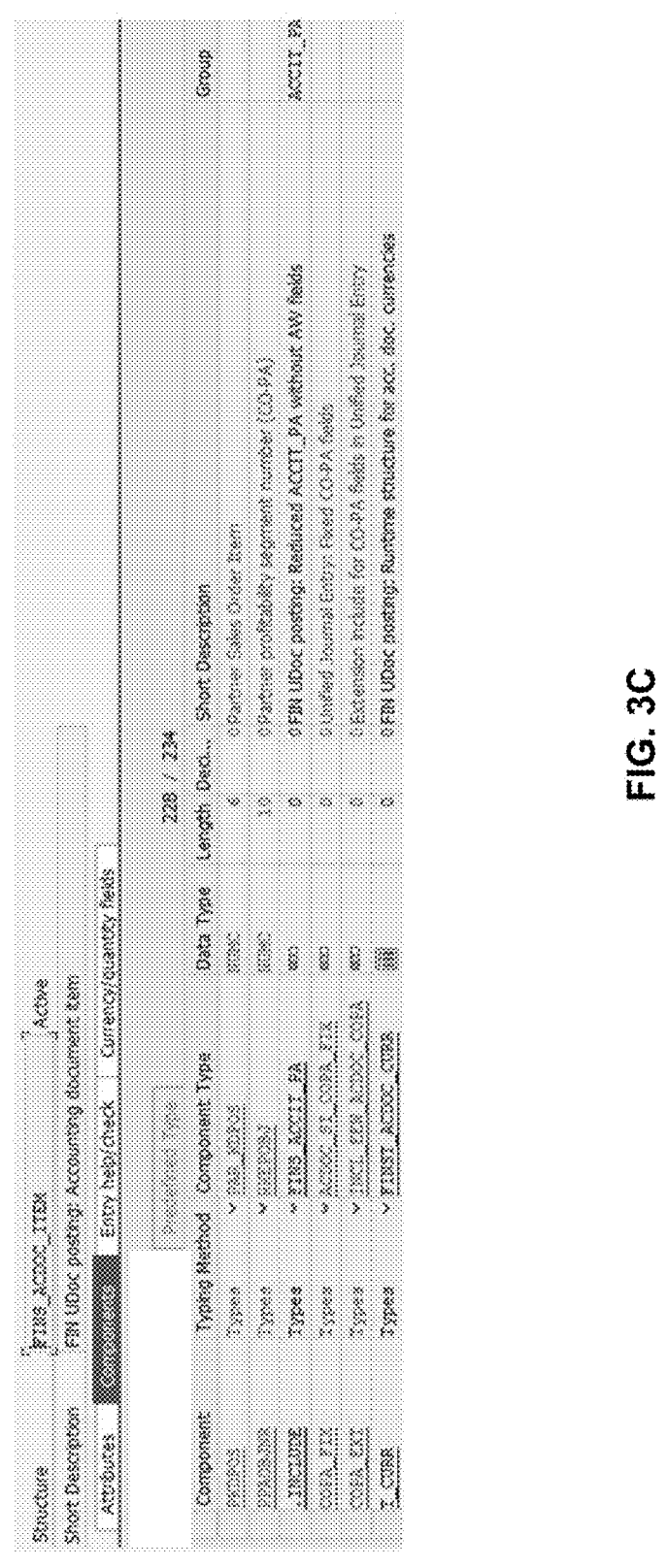

FIG. 3C shows another possible implementation of a UJE. Here, runtime structure FINS_ACDOC_ITEM comprises the same "includes" as ACDOC_SI_COPA, but as subcomponents, not as includes. No suffix is needed here.

CO-PA fields can be addressed identically in the runtime structure and in the table:
 FINS_ACDOC_ITEM-COPA_FIX-FKART=ACDOCA-COPA_FIX-FKART (=ACDOCA-FKART)
 FINS_ACDOC_ITEM-COPA_EXT-WWHUGO=ACDOCA-COPA_EXT-WWHUGO (=ACDOCA-WWHUGO_PA)

The use of separate extension "includes", allows separate treatment for FIORI extensibility. Coding block fields only may be visible on the planned coding block reuse UI component. CO-PA fields are visible in a separate section of the document display only.

Figure 3D:
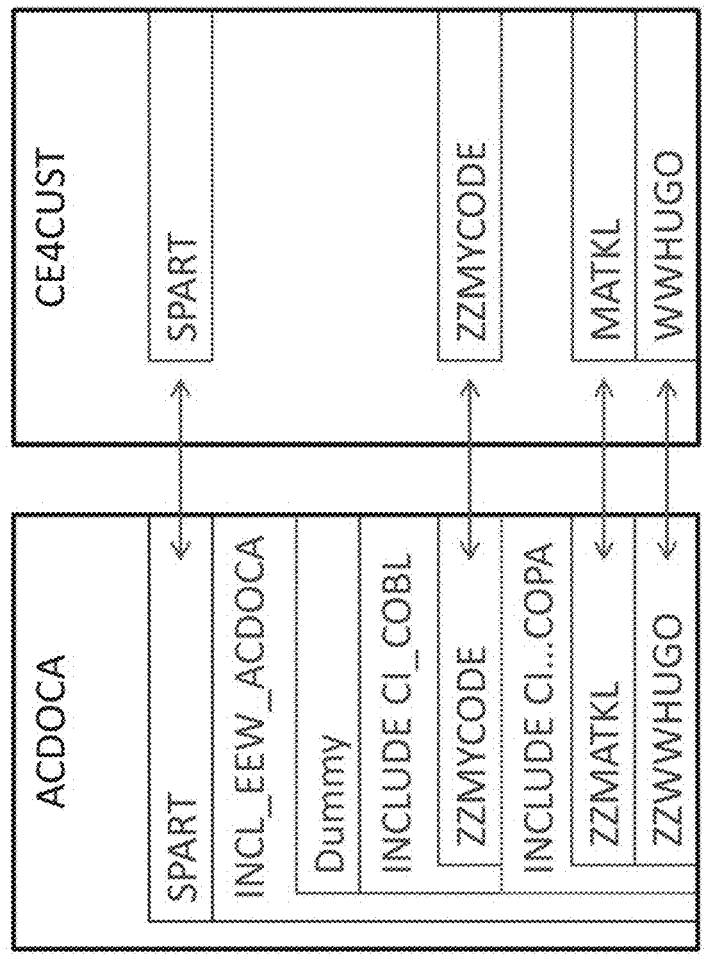

FIG. 3D shows a simplified view of a UJE according to an embodiment. This embodiment offers extensibility and includes CO-PA market segment structure. By system setup the already defined market segments (existing customers) may be added to a new UJE. For new customers it will be generated when a customer maintains his market segment structure.

Here the INCL_EEW_ACDOCA extension includes for coding block customer fields and market segment characteristics not included in a standard. INCLUDE CI . . . COPA is a customer package. The fields start with Z/Y. There is no separation from CI_COBL fields for FIORI extensibility.

CE4CUST is a CO-PA/Market segment table including characteristics encoded by object numbers (PAOBJNR). It is generated in package KEG0.

Figure 3E:
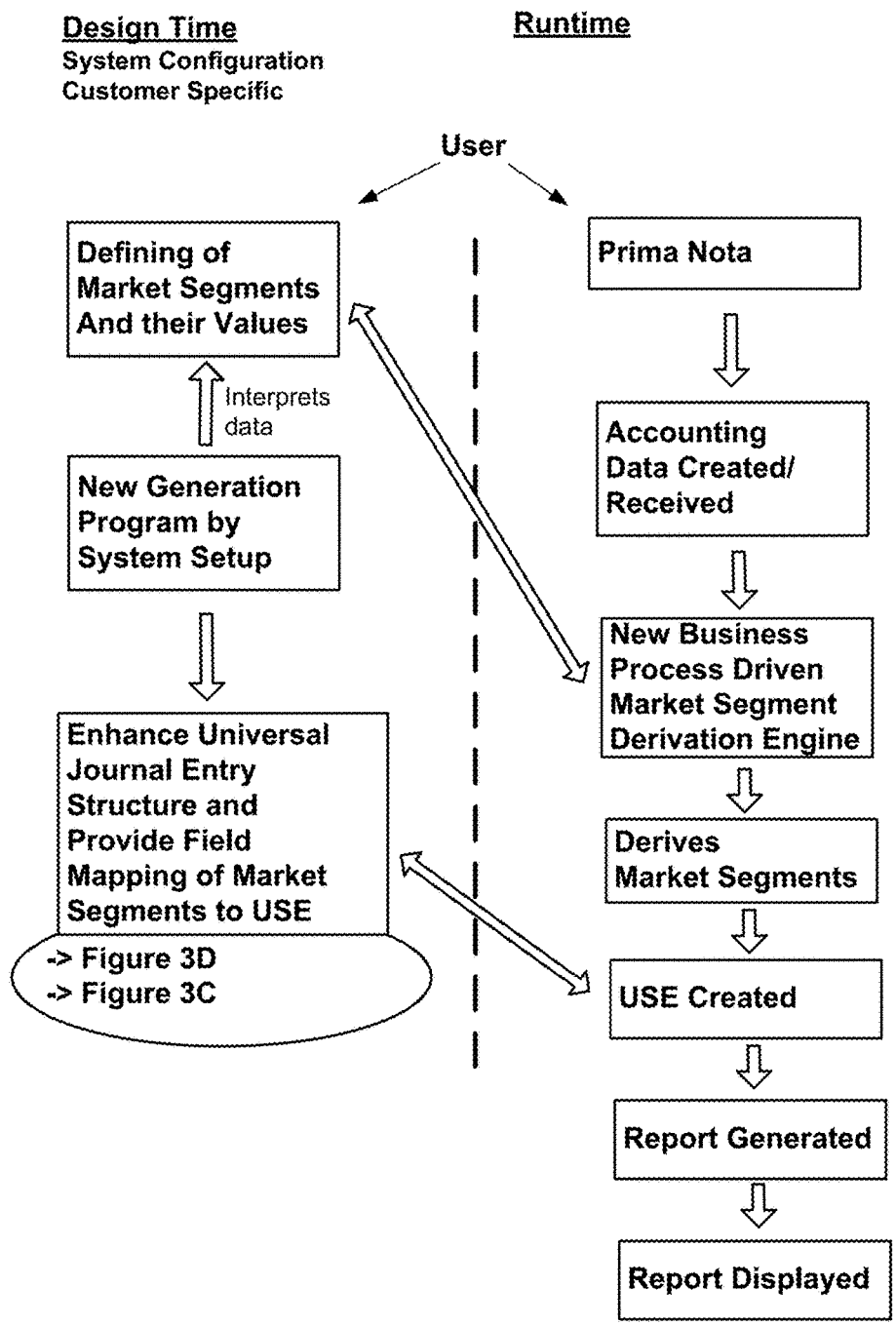
FIG. 3E is a simplified flow diagram illustrating design time and runtime process flows according to an embodiment.

FIG. 3E is a simplified flow diagram illustrating design time and runtime process flows according to an embodiment. Design time comprises a new generation program by system setup. Data is interpreted, and market segments and their values are defined. As mentioned previously in connection with FIGS. 3C-3D, the UJE structure may be enhanced and field mapping of market segments provided.

The runtime process commences with receipt of a prima nota such as an invoice. Accounting data is created/received from various sources. A market segment derivation engine is driven by the new business process, referencing the previous definition of market segments and their values during design time. Market segments are next derived, and the USE created with reference to the (enhanced) UJE structure previously established at design time. Finally, a report is generated and displayed.

In summary, embodiments may provide enriched market segment information within a financial document. For example, an embodiment may provide customer specific fields in a single financial document structure. This avoids having separate storage or separate documents for purposes of cost management and profitability reporting.

Embodiments may allow a user to provide rules defining market segments in a flexible manner. For example, a user may create a report region rule to derive a region from customer master data.

Utilizing system setup, embodiments may generate these fields as appended to the financial document structure/universal journal entry, and store the link between the defined market segment characteristics and the field in the financial document structure.

Embodiments enrich relevant financials document line items with the defined market segment information during document posting. This is provided for P&L and selected balance line items.

Embodiments may employ a business process dependent rules engine to provide enriched data. The rules engine allows control over those market segments provided and updated. Additional characteristics information may be derived on the basis of the business process dependent rules. These rules can be activated and maintained by the customer.

Examples of scenarios utilizing enriched reporting can include but are not limited to the following. For posting a sales order item, the data of the sales order is read to obtain customer, product, and other sales order information. On the basis of the determined master data, further additional data can be derived depending on information furnished by the user.

Another example relates to posting on a customer project. There, embodiments can determine the leading sales order item, and start a derivation chain as described above.

Regarding deferred and accrued costs and revenues, embodiments can provide in balance line items, characteristics such customer and project.

In some processes a user can directly define market segment information. In such cases, there may be no additional derivation chain. Also, in some logistics processes it may not make sense to employ derivation in order to obtain sensed data, e.g., there may be no need to derive market segments for material price differences of raw materials.

Embodiments may provide additional P&L line items for calculatory costs. Thus, additional line items may be provided for the cost component split at the point of time of delivery posting. This information is obtained by reading cost estimation.

Some embodiments may provide additional line items reflecting the different production variances categories (e.g. scrap, price difference, quantity differences) at the point of time of production order settlement.

Embodiments may post calculatory costs on base of customer sales order and billing information, like freights or provision and customer deductions by interpreting the pricing conditions and further customer specific customization. Additional line items may be posted to provide the information.

Methods and systems of financial reporting according to embodiments may allow for flexible characteristic realignment. In particular, a market segment characteristic may be derived at a point in time of financial document posting to afford insights in near-real time.

Embodiments provide a realignment tool to derive market segments for already posted documents (e.g., for data migrated from other ERP versions). Where a new market segment is defined, existing structures and/or master data may be changed and some new characteristics derived.

Financial reporting embodiments may be compatible with existing data warehouses. Thus, legacy posted information (e.g. lacking the journal entry) may be processed according to the rule engine, in order to obtain enriched insight for that past data.

Embodiments as described herein may provide one or more benefits to a user. One potential benefit is the lack of need for complex and difficult reconciliation efforts. That is, the cost Management and profitability application receives the data out of an income statement—a single source of truth.

Financial reporting systems and methods according to embodiments may also offer the advantage of simplification. That is, data transfer and translation between different financials application is no longer necessary—e.g., there is no settlement.

Also, the same language may be used for different types of financial data. Because the same entities are used for accounting and profitability reporting, there is no need to account for different aggregation, posted periods, and values in different applications.

Financial documents enriched according to embodiments may offer valuable new insights to a user. Some embodiments provide gross margin on market segment out of profit and loss data (income statement).

Certain embodiments may allow a user to drill down on expense in GL Accounts on market segments—e.g., travel per region. An example display afforded by such analysis is shown in the FIG. 2D that is discussed above.

Embodiments can show open items on a project or region level. A project manager can thus be afforded a holistic view of work in process, accrued revenues, open items—not limited to current P&L.

Moreover, embodiments provide additional characteristics at the time of creation of the financial document. This allows reporting of profitability in near real time, not restricted to conventional backwards-looking profitability.

Embodiments may provide higher quality financial data, affording better transparency and easing compliance burdens. Here, profitability is not just another Key Performance Indicator (KPI) whose internal make-up is not readily apparent to an ordinary user. Instead, a user can drill down into the financial document to identify components and significant relationships therebetween.

Embodiments may further offer simplified extensibility from user-specific fields. Only one table need be enhanced, with one resulting accounting document useful across a variety of different financial applications.

A user can define characteristics relevant to a particular business. That characteristic may then automatically be published in relevant financial document line items. Thus in an example, a user comprising a professional service company may seek revenue and Cost of Goods Sold (COGS) on an employee level. The user may define regions like Asia Pacific Japan (APJ) or Europe, Middle East, and Africa (EMEA), which are aggregations of individual countries.

Additional general ledger (GL) line items useful for purposes of providing multi-level gross margin, may be posted in a Cost Management Appendix ledger. Examples may include but are not limited to the following.

- A cost component split at the point of time of delivery posting. This information is obtained by reading cost estimation.
- A line item reflecting the different production variances categories (e.g., scrap, price difference, quantity differences) at the point of time of production order settlement.
- Calculatory costs on base of customer sales order and billing information, like freights or provision and customer deductions by interpreting the pricing conditions and further customer specific customization.

Embodiments may allow a user to decide in which ledger to post, permitting separation of legal and management accounting.

Figure 4:
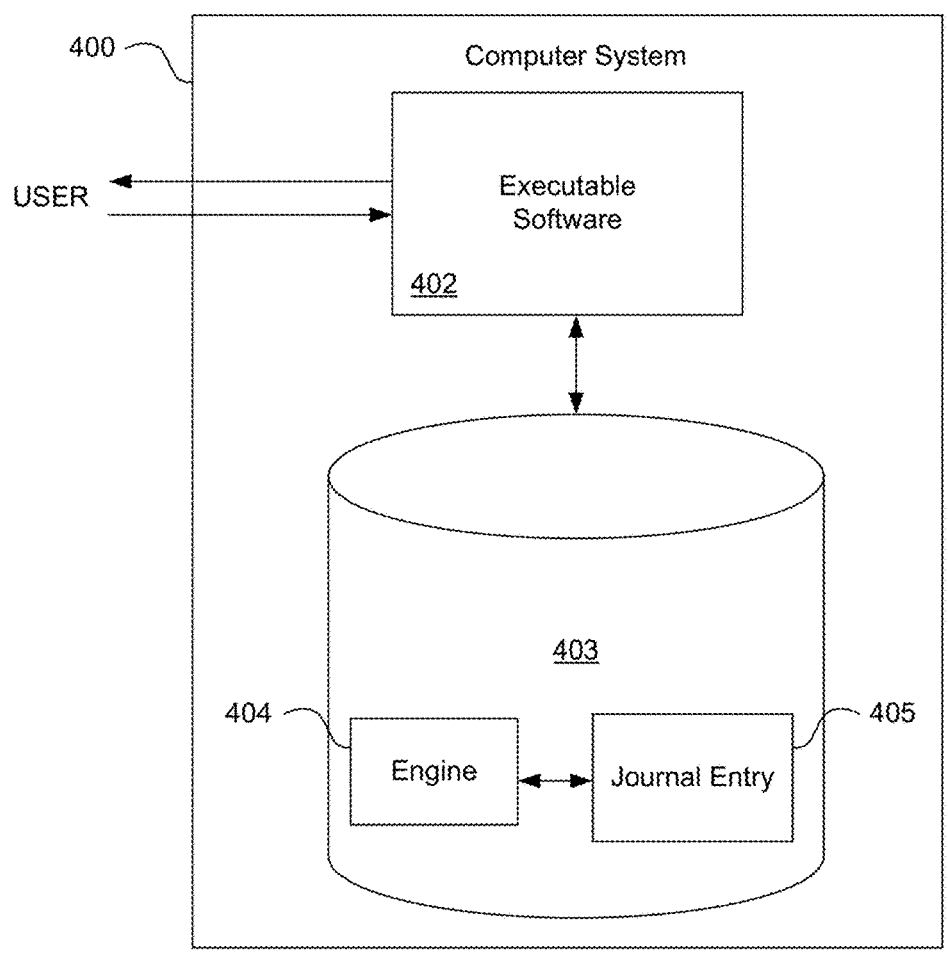
FIG. 4 illustrates hardware of a special purpose computing machine configured to provide financial reporting according to an embodiment.

FIG. 4 illustrates hardware of a special purpose computing machine configured to provide integrated financial reporting according to an embodiment. In particular, computer system 400 comprises a processor 402 that is in electronic communication with a non-transitory computer-readable storage medium 403. This computer-readable storage medium has stored thereon code 405 corresponding to a universal journal entry. Code 404 corresponds to an engine. Code may be configured to reference financial data (e.g., both accounting an profitability analysis-based) that is stored in a database of a non-transitory computer-readable storage medium, for example as may be present locally or in a remote database server. Software servers together may form a cluster or logical network of computer systems programmed with software programs that communicate with each other and work together in order to process requests.

An example computer system 510 is illustrated in FIG. 5. Computer system 510 includes a bus 505 or other communication mechanism for communicating information, and a processor 501 coupled with bus 505 for processing information. Computer system 510 also includes a memory 502 coupled to bus 505 for storing information and instructions to be executed by processor 501, including information and instructions for performing the techniques described above, for example. This memory may also be used for storing variables or other intermediate information during execution of instructions to be executed by processor 501. Possible implementations of this memory may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 503 may include source code, binary code, or software files for performing the techniques above, for example. Storage device and memory are both examples of computer readable mediums.

Computer system 510 may be coupled via bus 505 to a display 512, such as a cathode ray tube (CRT) or liquid crystal display (LCD), for displaying information to a computer user. An input device 511 such as a keyboard and/or mouse is coupled to bus 505 for communicating information and command selections from the user to processor 501. The combination of these components allows the user to communicate with the system. In some systems, bus 505 may be divided into multiple specialized buses.

Computer system 510 also includes a network interface 504 coupled with bus 505. Network interface 504 may provide two-way data communication between computer system 510 and the local network 520. The network interface 504 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 504 sends and receives electrical, electromagnetic, or optical signals that carry digital data streams representing various types of information.

Computer system 510 can send and receive information, including messages or other interface actions, through the network interface 504 across a local network 520, an Intranet, or the Internet 530. For a local network, computer system 510 may communicate with a plurality of other computer machines, such as server 515. Accordingly, computer system 510 and server computer systems represented by server 515 may form a cloud computing network, which may be programmed with processes described herein. In the Internet example, software components or services may reside on multiple different computer systems 510 or servers 531-435 across the network. The processes described above may be implemented on one or more servers, for example. A server 531 may transmit actions or messages from one component, through Internet 530, local network 520, and network interface 504 to a component on computer system 510. The software components and processes described above may be implemented on any computer system and send and/or receive information across a network, for example.

The above description illustrates various embodiments along with examples of how aspects may be implemented. The above examples and embodiments should not be deemed to be the only embodiments, and are presented to illustrate the flexibility and potential benefits as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
   a non-transitory computer readable storage medium embodying an in-memory database and an in-memory database engine, the in-memory database engine receiving accounting data of a financial document comprising an existing table of the in-memory database;
   the in-memory database engine receiving market segment information defined with a plurality of characteristics;
   the in-memory database engine integrating the plurality of characteristics with the accounting data according to a ruleset to generate a universal journal entry as a database table of the in-memory database including an extension to the existing table comprising a line item broken down into the plurality of characteristics, wherein:
   the extension comprises a suffix with an object number encoding at least one of the plurality of characteristics, and
   in response to the extension, the in-memory database engine generates an appendix (APPEND) to hold additional characteristics and provide a linkage between the additional characteristics and the financial document; and the engine displaying a report including the line item and the at least one of the plurality of characteristics from the in-memory database, wherein the in-memory database engine references the extension to display a field of market segment information visible only in a separate section of a document display.

2. A method as in claim 1 wherein the plurality of characteristics are stored in the line item according to business process dependent rules of the ruleset.

3. A method as in claim 1 wherein the line item comprises aggregated profit.

4. A method as in claim 1 wherein the line item comprises income.

5. A method as in claim 1 wherein the line item comprises expenses.

6. A method as in claim 1 wherein the report comprises a plot having an axis reflecting the at least one of the plurality of characteristics.

7. A method as in claim 1 wherein the at least one of the plurality of characteristics comprises a product line, geographic region, or customer.

8. A method as in claim 1 wherein the at least one of the plurality of characteristics comprises a cost accounting object type.

9. A non-transitory computer readable storage medium embodying a computer program for performing a method, said method comprising:
 an in-memory database engine receiving accounting data of a financial document comprising an existing table of an in-memory database;
 the in-memory database engine receiving market segment information defined with a plurality of characteristics;
 the in-memory database engine integrating the plurality of characteristics with the accounting data according to a ruleset to generate a universal journal entry as a database table of the in-memory database including an extension to the existing table comprising a line item broken down into the plurality of characteristics based upon business process dependent rules of the ruleset, wherein:
  the extension comprises a suffix with an object number encoding at least one of the plurality of characteristics, and
  in response to the extension, the in-memory database engine generates an appendix (APPEND) to hold additional characteristics and provide a linkage between the additional characteristics and the financial document; and
 the in-memory database engine displaying a report including the line item and at least one of the plurality of characteristics from the in-memory database, wherein the in-memory database engine references the extension to display a field of market segment information visible only in a separate section of a document display.

10. A non-transitory computer readable storage medium as in claim 9 wherein the report comprises a plot having an axis reflecting the at least one of the plurality of characteristics.

11. A non-transitory computer readable storage medium as in claim 9 wherein the at least one of the characteristics comprises a cost accounting object type.

12. A non-transitory computer readable storage medium as in claim 9 wherein the at least one of the characteristics comprises a customer project.

13. A non-transitory computer readable storage medium as in claim 9 wherein the at least one of the characteristics comprises time information.

14. A computer system comprising:
 one or more processors;
 a software program, executable on said computer system, the software program configured to cause an in-memory database engine stored in a non-transitory computer readable storage medium with an in-memory database to:
 receive accounting data of a financial document comprising an existing table of the in-memory database;
 receive market segment information including a plurality of characteristics;
 integrate the profitability data with the accounting data according to a ruleset to generate a universal journal entry as a database table of the in-memory database including an extension to the existing table comprising a line item broken down into the plurality of characteristics based upon business process dependent rules of the ruleset, wherein the line item comprises income or expense, wherein:
  the extension comprises a suffix with an object number encoding at least one of the plurality of characteristics, and
  in response to the extension, the in-memory database engine generates an appendix (APPEND) to hold additional characteristics and provide a linkage between the additional characteristics and the financial document; and
 display a report including the line item and at least one of the characteristics from the in-memory database, wherein the in-memory database engine references the extension to display a field of market segment information visible only in a separate section of a document display.

15. A computer system as in claim 14 wherein the at least one of the characteristics comprises a cost accounting object type.

16. A computer system as in claim 14 wherein the report comprises a plot having an axis reflecting the at least one of the characteristics.

17. A computer system as in claim 14 wherein the at least one of the characteristics comprises a product, a customer project, or time information.

* * * * *